(12) United States Patent
Clark

(10) Patent No.: US 7,862,265 B1
(45) Date of Patent: Jan. 4, 2011

(54) OFF-SET DRILL GUIDE ASSEMBLY AND METHOD OF DRILLING HOLES IN A WORKPIECE

(76) Inventor: Bruce A. Clark, 1457 Marshall Ave., St. Paul, MN (US) 55104

( * ) Notice: Subject to any disclaimer, the term of this patent is extended or adjusted under 35 U.S.C. 154(b) by 1041 days.

(21) Appl. No.: 11/645,345

(22) Filed: Dec. 26, 2006

Related U.S. Application Data

(60) Provisional application No. 60/846,436, filed on Sep. 25, 2006.

(51) Int. Cl.
*B23B 47/00* (2006.01)
(52) U.S. Cl. .................. 408/110; 408/236
(58) Field of Classification Search ......... 408/110–112, 408/234–237, 113–114
See application file for complete search history.

(56) References Cited

U.S. PATENT DOCUMENTS

| | | | | |
|---|---|---|---|---|
| 1,395,194 A | * | 10/1921 | Lindhe | 408/92 |
| 2,052,600 A | * | 9/1936 | Boss | 142/1 |
| 2,434,732 A | * | 1/1948 | Alick | 408/241 R |
| 2,587,520 A | * | 2/1952 | Peplow | 408/88 |
| 2,671,478 A | * | 3/1954 | Anderson et al. | 144/24.12 |
| 3,088,341 A | * | 5/1963 | Roman-Garcia | 408/88 |
| 3,853,420 A | | 12/1974 | Abell | |
| 4,284,373 A | | 8/1981 | Wolff | |
| 4,582,105 A | | 4/1986 | Wolff | |
| 5,150,993 A | | 9/1992 | Miller | |
| 5,244,048 A | | 9/1993 | Moorhead, Sr. | |
| 5,346,337 A | * | 9/1994 | Truesdell | 408/1 R |
| 5,713,702 A | | 2/1998 | Turner | |
| 5,954,460 A | | 9/1999 | Degen et al. | |
| 6,692,201 B2 | | 2/2004 | Soderman | |
| 6,880,595 B2 | * | 4/2005 | Nuss | 144/135.2 |
| 2003/0143041 A1 | | 7/2003 | Soderman | |

FOREIGN PATENT DOCUMENTS

DE 1477258 A1 * 9/1969
DE 3326697 A1 * 2/1985

* cited by examiner

*Primary Examiner*—Daniel W Howell
(74) *Attorney, Agent, or Firm*—Richard John Bartz

(57) ABSTRACT

An off-set drill guide assembly useable with a conventional drill press or bench vice and portable power tool to drill holes in a workpiece has a body chucked to the drill press supporting a horizontal slide connected to the power tool with an adapter to locate the power tool off-set from the drill press beyond the normal range of the drill press. The body and power tool are moved downward to drill holes in a workpiece.

15 Claims, 8 Drawing Sheets

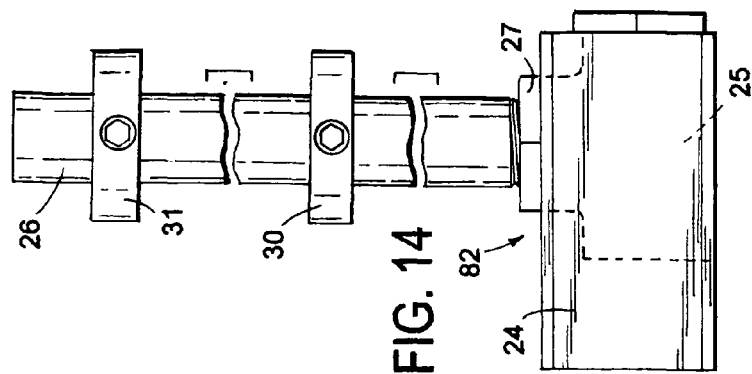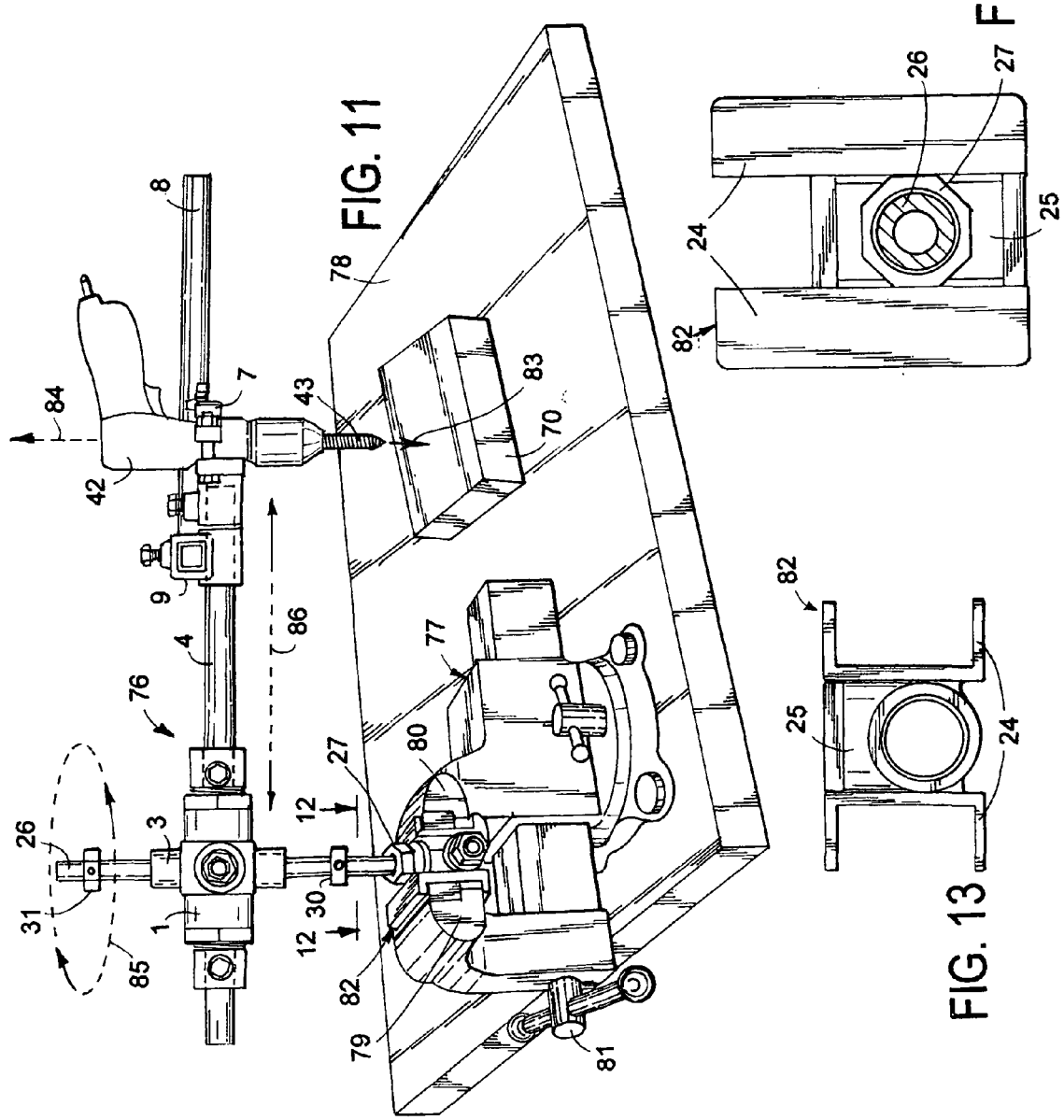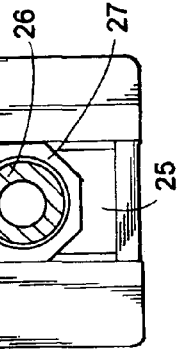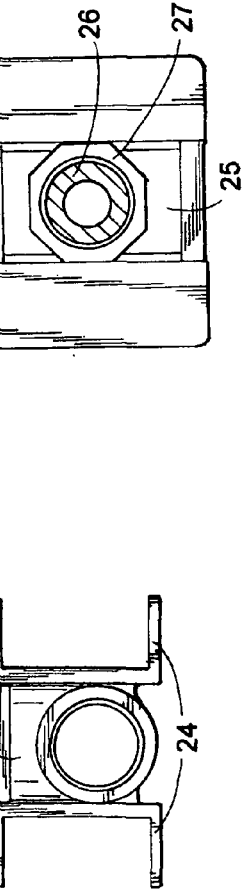

OFF-SET DRILL GUIDE ASSEMBLY AND METHOD OF DRILLING HOLES IN A WORKPIECE

CROSS REFERENCE TO RELATED APPLICATION

This application claims the priority benefit of U.S. Provisional Application Ser. No. 60/846,436 filed Sep. 25, 2006.

FIELD OF THE INVENTION

The invention is in the art relating to hand electric drill guide assemblies useable with drill presses, drill stands and vises to drill, ream and tap holes in workpieces.

BACKGROUND OF THE INVENTION

Conventional drill presses have use limitations concerning the locations and sizes of the workpieces that can be accommodated for drilling, reaming, and tapping holes at selected locations in the workpieces. In conventional drill presses, the size of the workpiece being worked is limited by the lateral distance from the drill press chuck centerline to the face of the drill press column. Holes in the workpiece cannot be drilled beyond this limited lateral distance. Handheld portable power tools with drill bits are used to drill holes in workpieces in remote locations in the workpieces. It is difficult to hold a handheld power tool to control the angle of engagement of the drill bit with the workpiece surface. In use, handheld power tools are subjected to torque generated by the drill bit engaging the workpiece known as reactive forces, or a counter torque response. Side handles have been attached to handheld power tools to counteract the reactive forces subjected to the power tools. The skill and strength of the workperson is critical to the successful use of handheld power tools to be successful to drill accurate holes in workpieces.

SUMMARY OF THE INVENTION

The off-set drill guide assembly and method for drilling holes in a workpiece of the invention utilizes the use of a conventional power locked out drill press and a portable air or electric drill in concert with each other to overcome the limitations of the drill press and a handheld power tool to drill, ream or tap holes in a workpiece. The off-set drill guide assembly is also used with a vise to drill holes in a workpiece with portable power tools. The off-set drill guide assembly overcomes the reactive forces subjected to the power tool by locking its position in relation to the workpiece. A side handle is not used with the power tool to counteract the reactive forces subjected to the power tool when the power tool is used in the invention.

The off-set drill guide assembly for a conventional drill press is used to drill, ream and thread tap holes in a workpiece located laterally or off-set from the drill press, beyond the normal range of the drill press. The drill guide assembly has a body with a chucking shaft adapted to be attached to the drill press chuck. The body includes a horizontal passage accommodating a horizontal slide, which is adjustable in a horizontal direction relative to the body. A lock mechanism including lock retainers or bolts cooperates with the body to retain the horizontal slide in adjusted horizontal and rotational positions. An adapter or clamp device holding a conventional electric hand drill is connected to the horizontal slide. A handle connected to the horizontal slide adjacent the adapter is used by the workperson to move the horizontal slide and power tool in the direction of the workpiece to drill desired holes in the workpiece. The horizontal slide is movable horizontally a distance to locate the power tool beyond the normal range of the drill press.

DESCRIPTION OF THE DRAWING

The drawing illustrates several positions and applications of the off-set drill guide assemblies for hand power tools, such as air and electric motor driven hand tools having different sizes, shapes and output power. The views of the off-set drill guide assemblies are described as follows:

FIG. 11 is a perspective view of a third modification of the vise mounted off-set drill guide assembly shown in FIG. 1;

FIG. 12 is an enlarged sectional view taken along line 12-12 of FIG. 11;

FIG. 13 is a front elevational view of FIG. 12;

FIG. 14 is an enlarged foreshortened side elevational view of the vise holder and upright guide of the off-set drill guide assembly of FIG. 11;

DESCRIPTION OF EMBODIMENTS OF INVENTION

Figure 1:
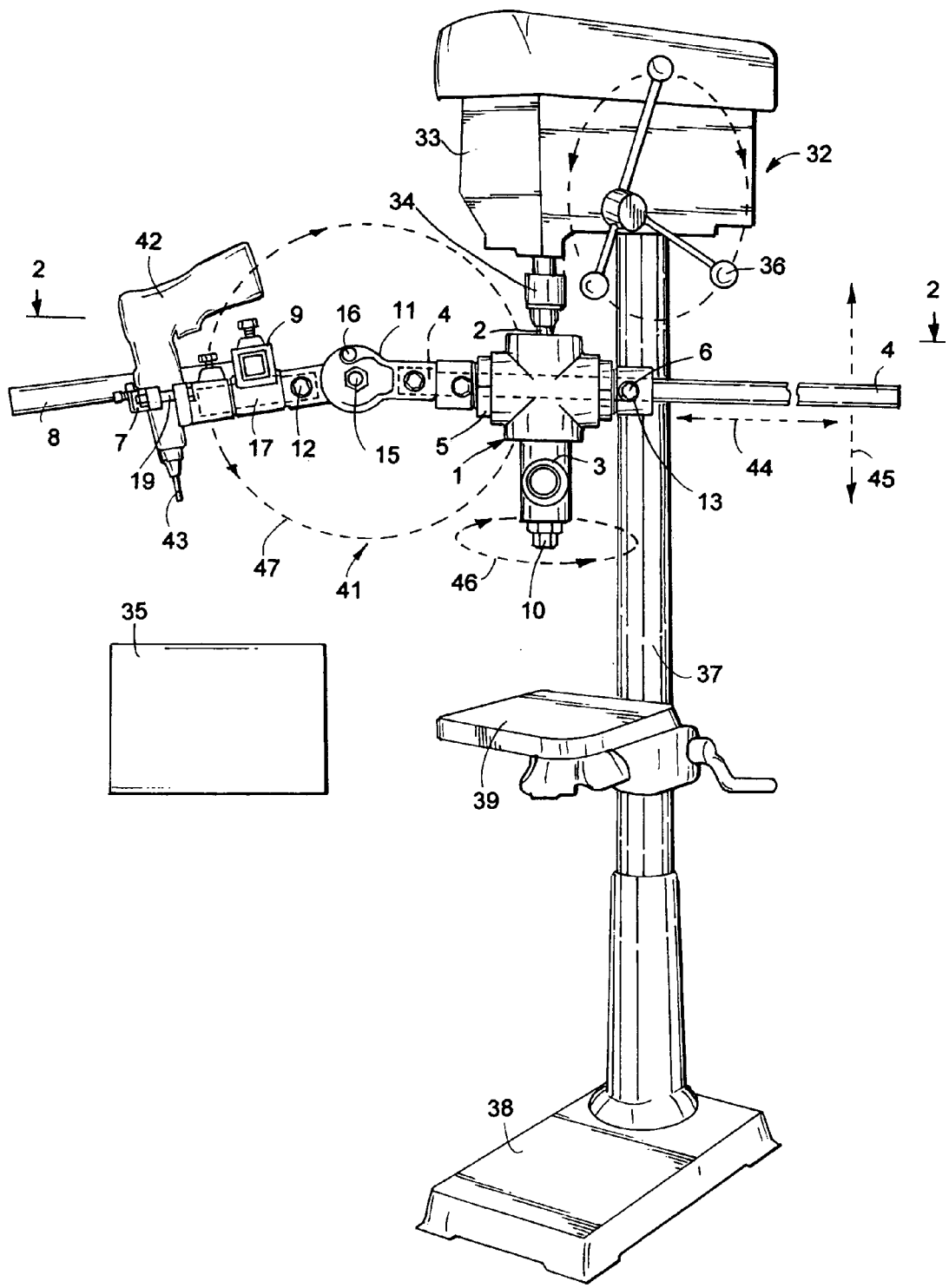
FIG. 1 is a perspective front elevational view of a drill press combined with the off-set drill guide assembly for an electric hand drill.

A conventional drill press 32, shown in FIG. 1, has a power head 33 including a tool chuck 34 connected to its drive shaft. A hand feed handle 36 operatively associated with the drive shaft is used to selectively raise and lower tool chuck 34 relative to a table 39 adjustable mounted on a column 37. A base 38 supports column 37 in an upright position. Table 39 is used to hold a workpiece 35, such as a metal casting. When chuck 34 is used with a drill bit to drill holes in the workpiece, the location of the holes in the workpiece is limited by the lateral distance between the vertical axis of chuck 34 and column 37. The off-set drill guide assembly 41 of the invention uses a power tool 42 coupled to a drill bit 43 to drill holes in workpiece 35 at selected lateral distances from the vertical axis of chuck 34. Power tool 42 is a hand air or electric drill having a chuck for holding a drill bit, a reamer or a thread tap.

The size and shape and HP output of the power tool can vary. Other types of tools including grinding, cutting, sanding, polishing, deburring, mixing, and hole saws can be used with the guide assembly of the invention. The following description is directed to a portable power tool housing a drill bit used to drill holes in a workpiece.

Figure 2:
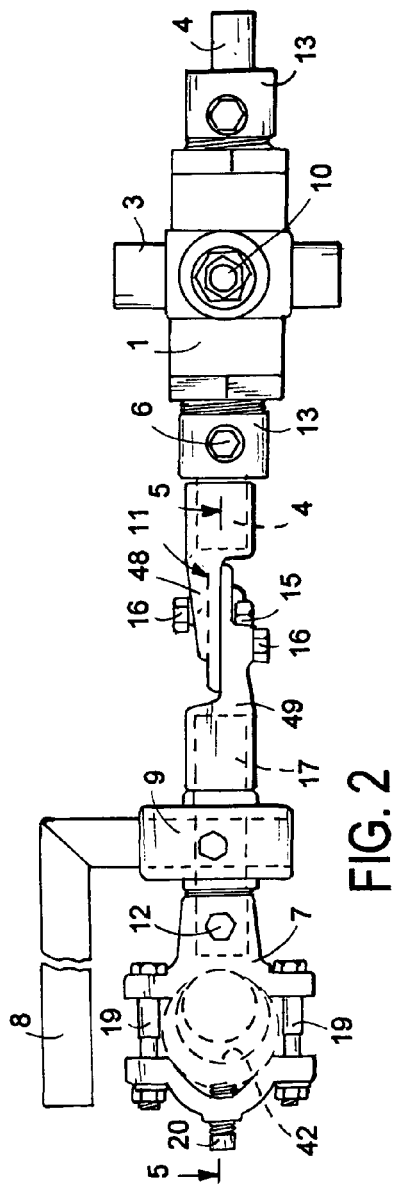
FIG. 2 is an enlarged sectional view taken along the line 2-2 of FIG. 1.
Figure 6:
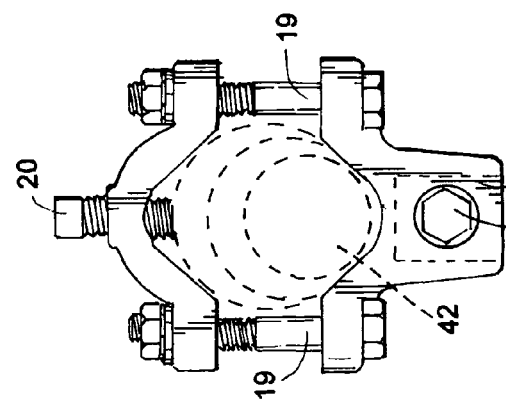
FIG. 6 is an enlarged top plan view of the distal end of the off-set drill guide assembly showing the hand drill holder.
Figure 5:
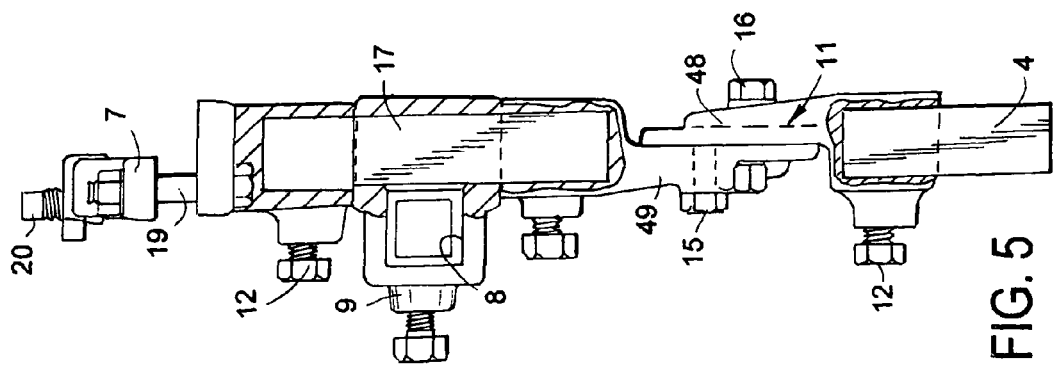
FIG. 5 is an enlarged sectional view taken along line 5-5 of FIG. 2.
Figure 3:
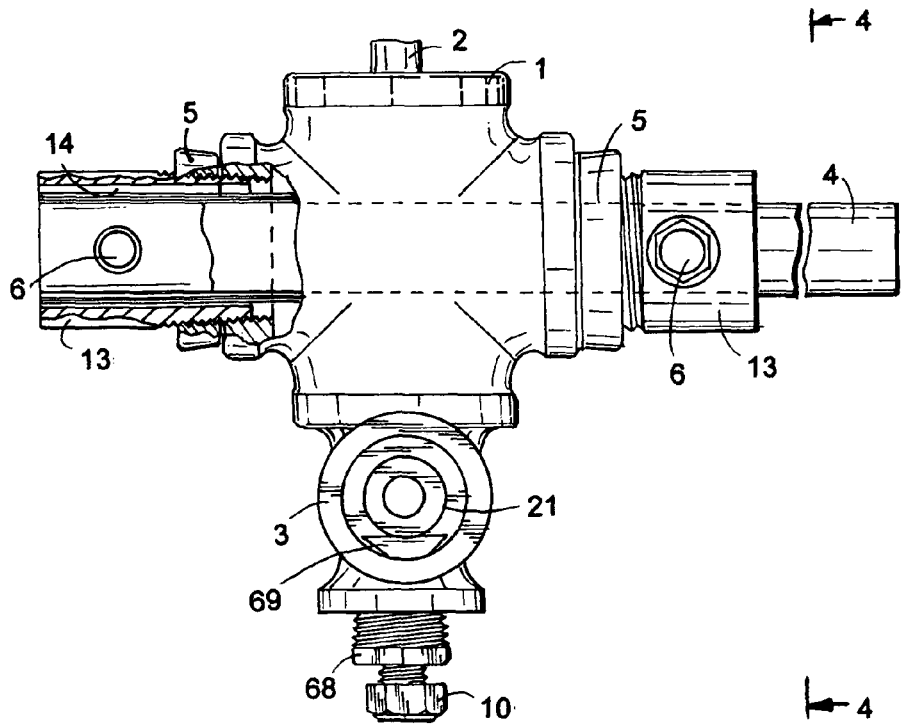
FIG. 3 is an enlarged side elevational view, partly sectioned, of the body assembly holding the horizontal slide of the off-set drill guide assembly.
Figure 4:
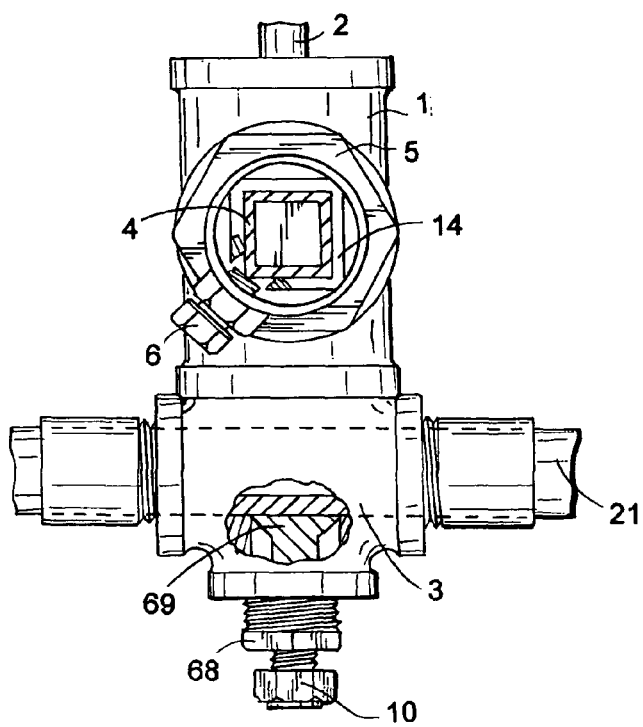
FIG. 4 is a sectional view taken along line 4-4 of FIG. 3.

Off-set drill guide assembly 41 includes a holder or body 1 having an upright chucking shaft 2 adapted to be held in drill press chuck 34. As shown in FIGS. 1, 2, 3 and 4, body 1 is connected to a vertical slide housing 3 accommodating a vertical slide 21 used in the power tool setup shown in FIG. 9. A horizontal slide 4, shown as an elongated linear square tubular member, extends horizontally through body 1. Lock nuts 5 threaded on tapered threaded sleeves 13 lock slide holders 14 on opposite ends of body 1. As shown in FIG. 4, a bolt 6 threaded into a nut secured to sleeve 13 retains slide 4 in its locked position on body 1. Bolt 6 and nuts 5 are released to allow slide 4 to be horizontally moved relative to body 1 to selectively extend or contract the horizontal length of off-set drill guide assembly. As shown in FIGS. 2 and 6, a power tool attachment or adapter 7 at the distal end of off-set drill guide assembly 41 comprising a pair of yoke members clamped around power tool 42. A pair of nut and bolt assemblies 19 combined with the yoke members allow different sized and shaped power tools to be retained by adapter 7. A set screw 20 threaded into adapter 7 engages power tool 42 to provide additional holding force on power tool 42. Adapter 7 can be attached to slide 4. An L-shaped force handle 8 has a transverse end located in a holder 9 mounted on a sleeve located around a bar or slide extension 17. Handle 8 is used by the workperson to apply leveraged down pressure to power tool 42 during the drilling of a hole in workpiece 35. A retainer bolt 12 secures adapter 7 to slide extension 17. Slides 4 and 17 are connected with a compound angle attachment 11 for fixing the alternate position of power tool 42 relative to slide 4. Attachment 11 has a first member 48 and a second member 49 pivotally connected with a pivot bolt 15 and retained in a selected angular position with an angle lock bolt 15. As shown in FIG. 1, attachment 11 allows power tool 42 to be rotated about the transverse axis of pivot bolt 15 shown by circular arrow 47. Slide 4 and handle 8 are used by the workperson to move power tool 42 downward shown by arrow 45 and rotate power tool 42 about a vertical axis as shown by circular arrows 46.

Figure 7:
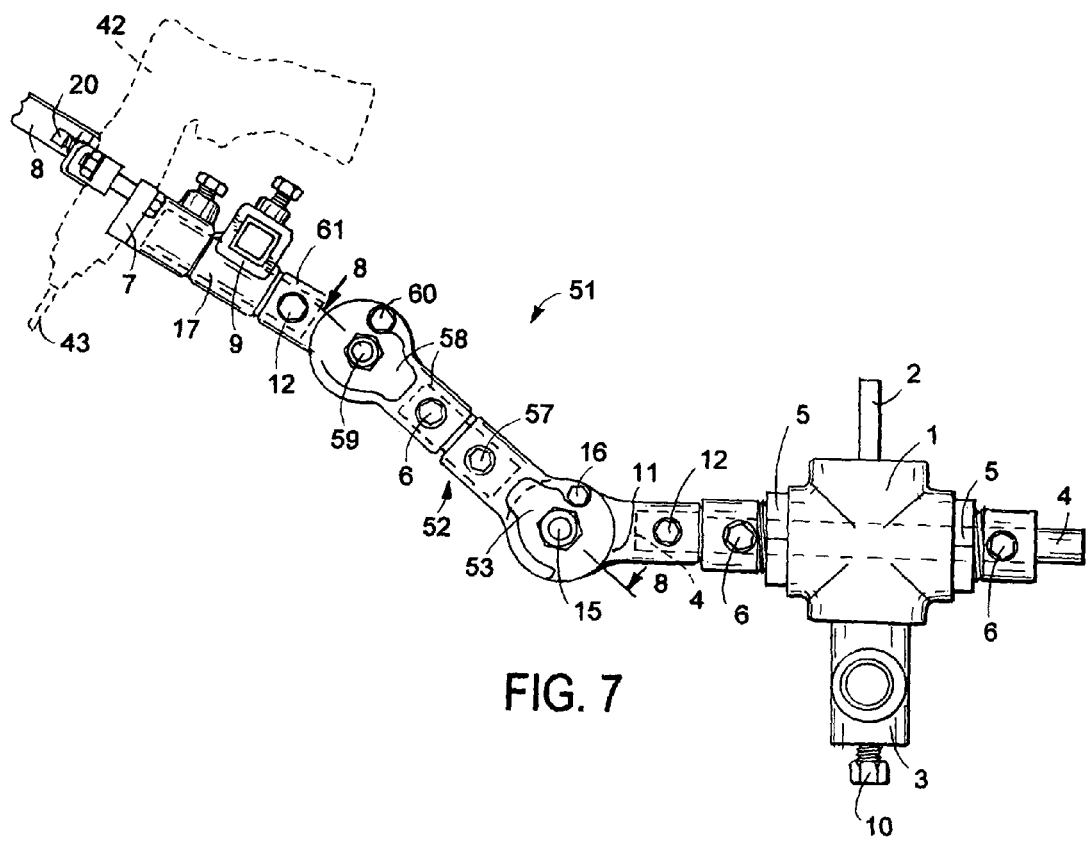
FIG. 7 is a side elevational view of a first modification of the off-set drill guide assembly shown in FIG. 1.
Figure 8:
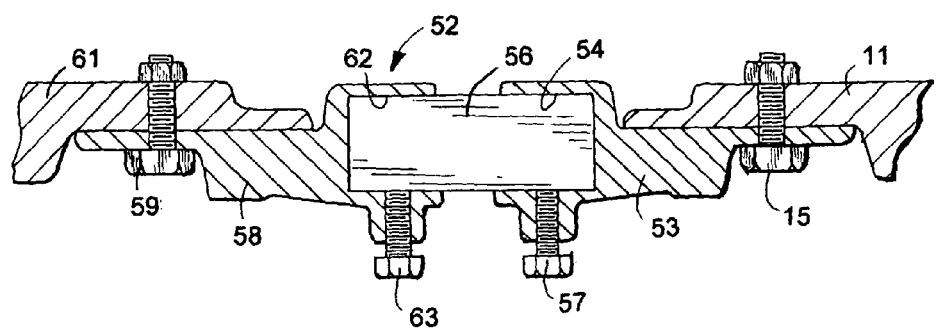
FIG. 8 is an enlarged sectional view taken along the line 8-8 of FIG. 7.

A first modification of off-set drill guide assembly 51, shown in FIGS. 7 and 8, has body 1 and adapter 7 connected with a double angle attachment 52 which permits power tool 42 to pivot about two parallel transverse axes. Attachment 52 has a first member 53 pivotally connected with pivot bolt 15. Member 53 has a socket 54 accommodating a bar 56. A set bolt 57 retains bar 56 on member 53. A second member 58 is pivotally connected with a pivot bolt 59 to member 61 of attachment 11. Member 58 has a socket 62 accommodating an end of bar 56. A set bolt 63 retains bar 56 on member 58. Bar 56 is a linear tubular member that can vary in length. The parts of the off-set drill press guide assembly 51 that correspond to the same parts of off-set drill press guide assembly have the same reference numbers.

Figure 9:
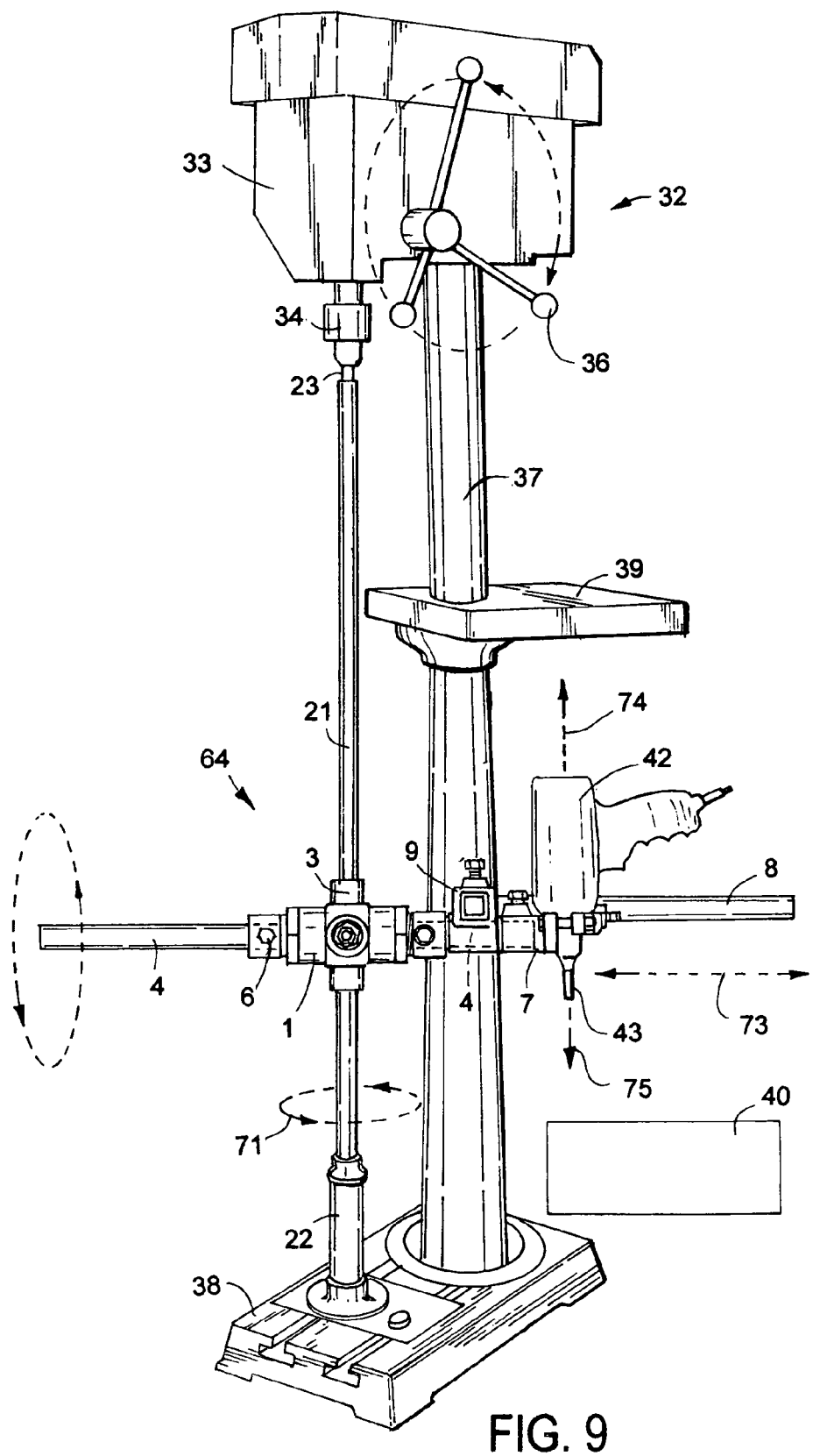
FIG. 9 is a perspective front elevational view of a drill press combined with a second modification of the off-set drill guide assembly shown in FIG. 1.
Figure 10:
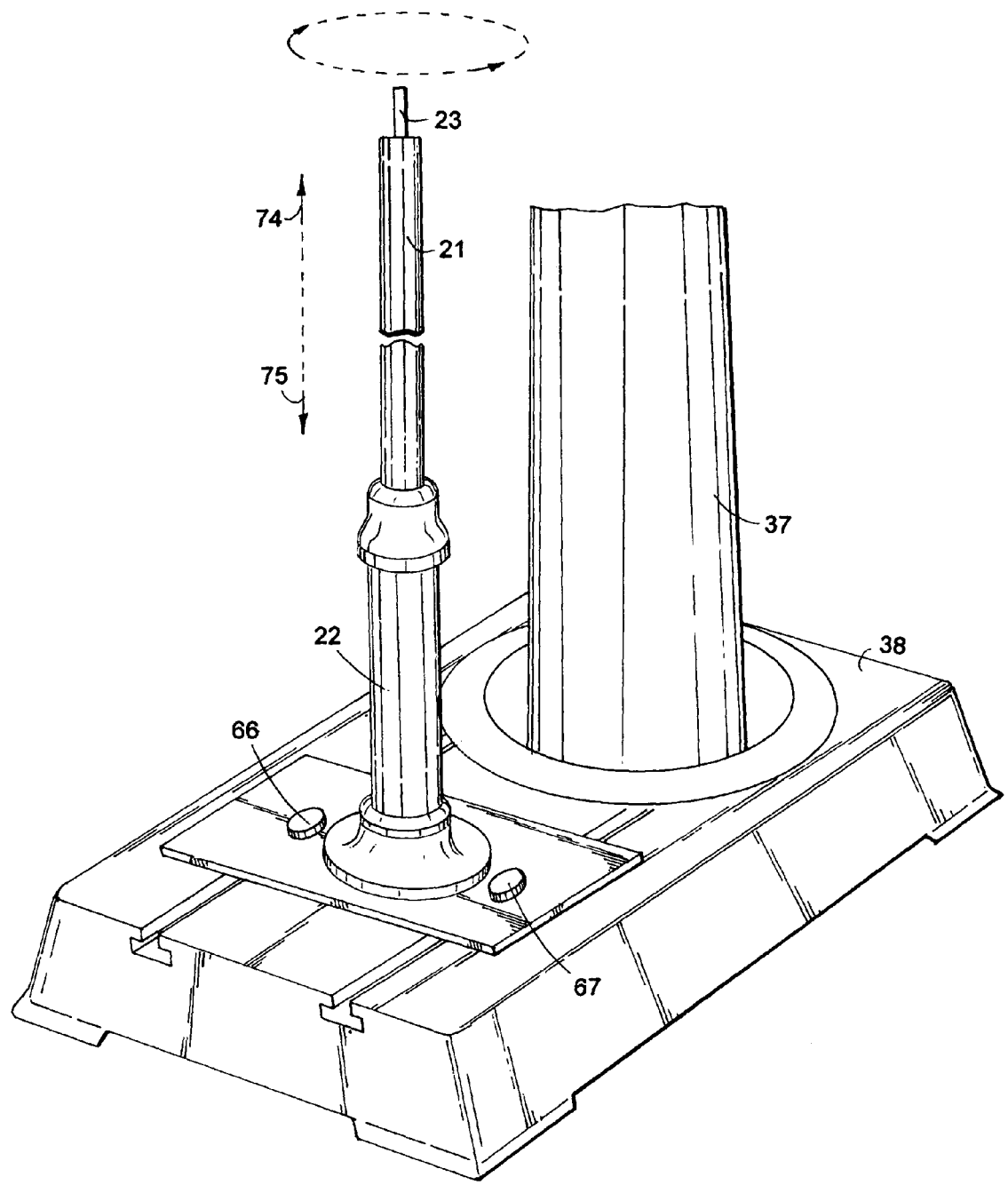
FIG. 10 is a perspective view of the drill press base and column of FIG. 9.

A second modification of off-set drill guide assembly 64, shown in FIGS. 9 and 10, is used with drill press 32 to drill holes in a workpiece 40 positioned adjacent base 38 of drill press 32. A vertical slide 21 extended through slide housing 3 has a chucking shaft 23 connected to drill press chuck 34. Slide 21 is an elongated cylindrical tubular member. The lower end of slide 21 extends into an anchor assembly 22. As shown in FIG. 10, a pair of bolts 66 and 67 secure anchor assembly 22 to base 38 in a position to retain slide 21 in vertical alignment with chuck 34. Returning to FIG. 4, a slide lock 10 threaded into a coupling 68 has a head 69 engageable with slide 21 to lock housing 3 on slide 21. When lock 10 is released power tool 42 can be rotated about a vertical axis shown by circular arrows 71 in FIG. 9. Power tool 42 is also rotatable about the horizontal axis of horizontal slide 4 as shown by circular arrows 72 and horizontally moved as shown by arrow 73 to position drill bit 43 on power tool in a selected location relative to workpiece 40. Feed handle 36 and force handle 8 are used by a workperson to move power tool 42 up and down in vertical directions, as shown by arrows 74 and 75, whereby drill bit 43 functions to drill a hole in workpiece 40. Anchor assembly 22 is an upright tubular sleeve located about the lower end of vertical slide 21. Slide 21 moves down into the sleeve when power tool 42 is moved downward to drill a hole in the workpiece. Off-set drill guide assembly 64 has body 1 mounted on horizontal slide 4. Slide retainers 6 releasably lock slide 4 on body 1 when power tool 42 is located in its selected horizontal position. Adapter 7 for power tool 42 is secured directly to slide 4. Attachments 11 and 52 can be used to connected power tool 42 to slide 4.

A third modification of off-set drill guide assembly 76, shown in FIGS. 11-14, is used with a bench vise 77 mounted on a worktable 78. Vise 77 has conventional jaws 79 and 80 movable relative to each other with a lead screw 81. A holder 82 for upright slide 26 is clamped between vise jaws 79 and 80. Holder 82 comprises a pair of channel members 24 secured to opposite sides of incorporated pipe "T" coupling 25. Channel members 24 have outwardly directed top and bottom flanges that fit over vise jaws 79 and 80. Pipe coupling 25 has opposite horizontal internal threaded ends and a top internal threaded opening. Slide 26 is an upright pipe threaded into the top threaded opening of pipe coupling 25. A lock nut 27 threaded on vertical slide 26 is turned down into engagement with pipe coupling 25 to retain vertical slide 26 on pipe coupling 25 as shown in FIG. 14. Body 1 is movable between stop collars 30 and 31 mounted on vertically spaced portions of slide 26 to allow power tool 42 to be selectively moved up and down as shown by arrows 83 and 84 to drill a hole in a workpiece 70 located on table 78. Power tool 42 being connected to horizontal slide 4 with adapter 7 is angularly moved about the upright axis of slide 26 as shown by circular arrow 85 and horizontally moved as shown by arrow 86. In use, the workperson uses force handle 8 to move power tool 48 and body 1 downward whereby drill bit 43 drills a hole in workpiece 70.

Figure 15:
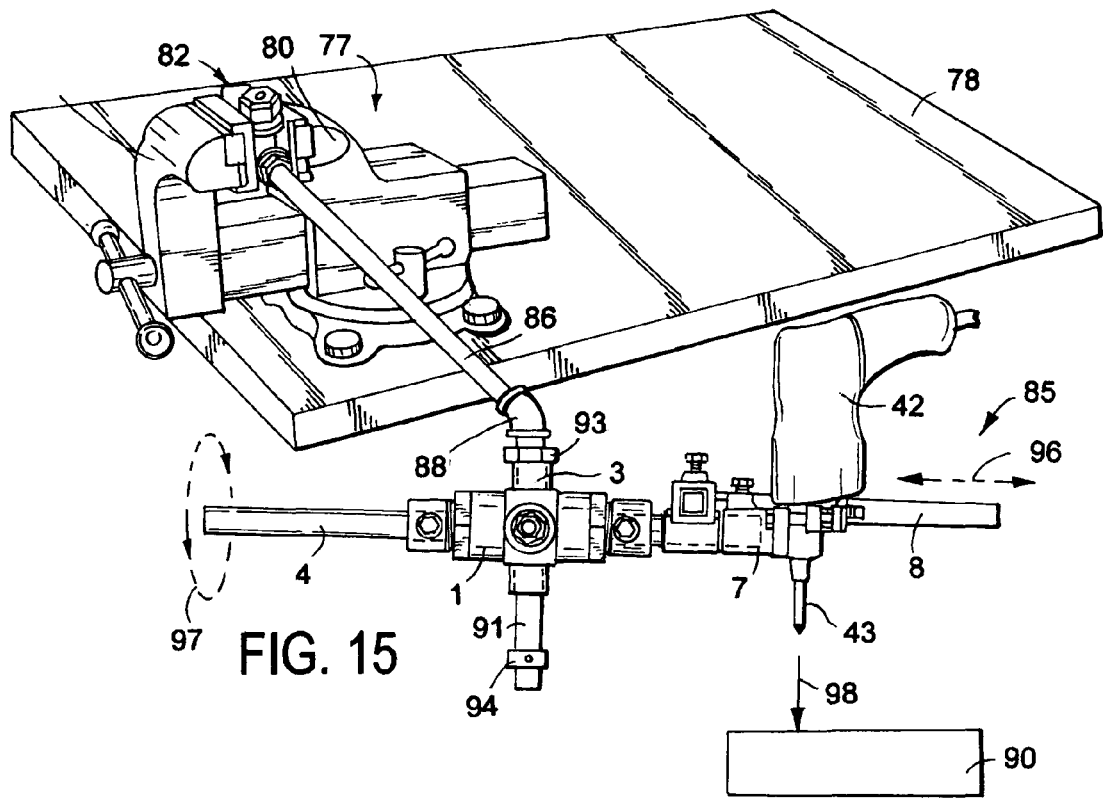
FIG. 15 is a perspective view of a fourth modification of the vise mounted off-set drill guide assembly shown in FIG. 1.
Figure 16:
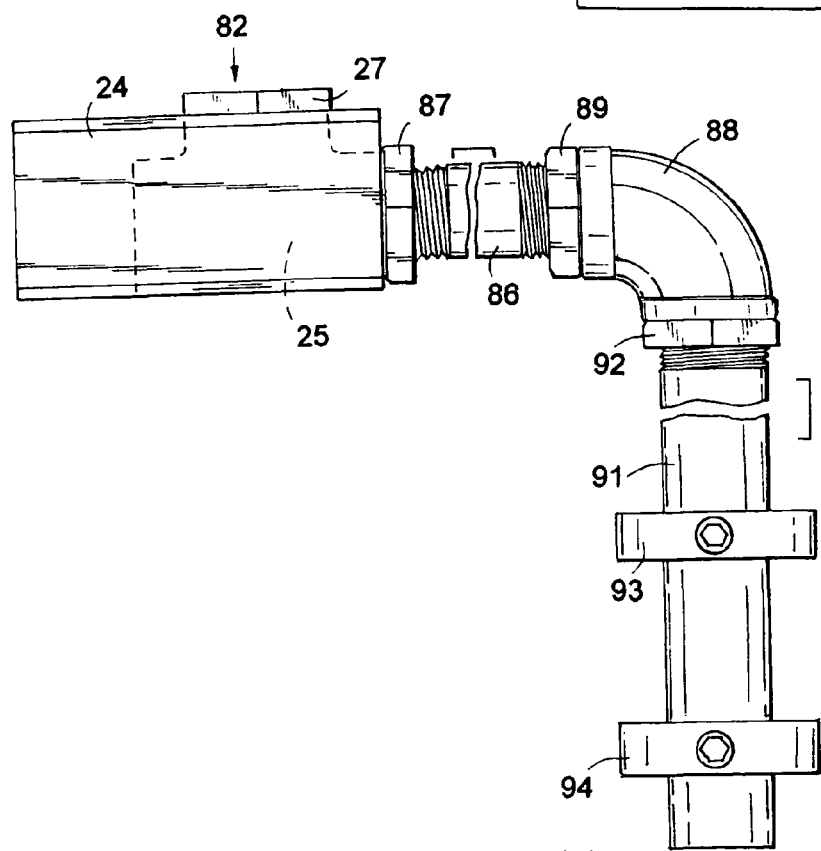
FIG. 16 is an enlarged foreshortened side elevational view of the vise holder and downward guide of the off-set drill guide assembly of FIG. 15.

A fourth modification of the off-set drill guide assembly 85, shown in FIGS. 15 and 16, is used to drill holes in a workpiece 90 located on the floor or a pallet adjacent worktable 78. Large workpieces, as metal castings, concrete objects and plastic parts, located below the level of table 78 can be provided with holes in selected locations with drill guide assembly 85. Drill guide assembly 85 mounting consists of a horizontal pipe 86 threaded into an end of inverted T-pipe coupling 25 of holder 82 and locked thereon with nut 87. Holder 82 is clamped on vice 77 with jaws 79 and 80. A right angle elbow 88 is threaded on the outer end of pipe 86 and locked thereon with locknuts 87 and 89. A second pipe 91 that functions as a vertical slide for body 1 is threaded into elbow 88 and locked thereon with nut 92. Collars 93 and 94 on pipe 91 above and below body 1 function as upper and lower stops for body 1 and power tool 42. Power tool 42 mounted on horizontal slide 4 with adapter 7 is horizontally movable as shown by arrow 96 and rotatable about the horizontal axis of slide 4 as shown by circular arrow 97 to align power tool 42 at a selected position relative to a workpiece. Power tool 42 and body 1 is moved downward as shown by arrow 98 to drill a hole in the workpiece. Stop collars 93 and 94 are adjustable on pipe 91 to limit the vertical travel of power tool 42.

The first step in the use of the off-set drill guide assembly is to determine which method of mounting to use. Applications are shown in FIG. 1, 7, 9, 11 or 15. FIG. 1 shows the drill press mount wherein the chucking shaft 2 is placed in the drill press chuck. Horizontal slide 4 is placed in body 1 and the required attachments are assembled to the horizontal slide. Each component is locked in place by an attachment retainer screw 12. The power tool 42 is positioned in the power tool adapter 7 and locked in with the locking bolts 19. Extra pressure can be applied, if needed, with the power tool attachment set screw 20. When extra force is needed to drive the tool into the work the force handle 8 is inserted into the force handle holder 9. The horizontal slide 4 is locked into its predetermined position radially by setting the horizontal slide to body lock nuts 5. The horizontal slide retainer 6 is set before locking the radial angle as just described. The locked angular position of the power tool is transferred to the horizontal slide 4 from the body 1 by the horizontal slide lock sleeve 13. The power tool 42 can be moved to a new position at the same angular setting by loosening retainer screw 6, moving horizontal slide 4 to its new position and tightening retainer screw 6.

The locking system just described allows for the power tool 42 to be rotated 360 degrees about the horizontal slide holder 14. An additional angle setting, 90 degrees from the first, can be set by rotating compound angle attachment 11 positioned next to the power tool. The angular position is fixed with the compound angle lock bolt 16. The compound angle attachment 11, in this position, has a range of 180 degrees about its tension bolt 15. With the angular positions set, the horizontal slide retainers 6 are loosed and the horizontal slide 4 positioned at the point of entry of the power tool 42 into the workpiece and slide retainer 6 reset. When angular adjustments are made to the power tool position by either the horizontal slide 4 or the compound angle attachment 11, the compound angle attachment nearest the body 1 is used in a hinging mode to allow the tool to progress into the work in a non-parallel direction. All applications, where power tool 42 is not operated parallel to the vertical slide 21 or drill press chuck, will require a second compound angle attachment 11 to allow the power tool to follow the preset angle of entry.

Depth of cut or distance of travel of the power tool can be set by the depth gage on the drill press or by the shaft set collars 30 and 31. Shaft set collars 93 and 94 are also used on the vertical slide 21.

All uses of this invention, which utilize a conventional drill press chuck as a holding member, require the power to the drill press be locked out. Using the drill press under power could result in injury to persons or damage to the equipment. The same restriction applies to any machine tool or device normally run under power used as a holding device for this invention.

The description and drawing of the off-set drill guide assembly have been directed to preferred embodiments and uses of the invention with conventional drill presses and bench vices in conjunction with portable hand tools. Various changes and substitutions of parts and arrangement of parts of the off-set drill guide assembly can be made by persons skilled in the art without departing from the invention.

The invention claimed is:

1. An off-set guide assembly useable with a drill press having a chuck and a power tool for drilling holes in a workpiece comprising: a body adapted to be connected to the chuck of the drill press for movement in up and down directions, said body having a horizontal passage, a horizontal slide extended through and moveable horizontally in the horizontal passage, a lock mechanism for holding the slide in a selected position on the body, an adapter for holding a power tool operable to drill a hole in a workpiece, a compound angle attachment connecting the slide to the adapter for allowing the adapter and power tool held thereon to be pivoted about two parallel transverse axes, and lock members for holding the adapter and power tool held thereon in a selected location whereby when the body is moved in the downward direction the adapter and power tool held thereon moves toward a workpiece causing the power tool to drill a hole in the workpiece.

2. The off-set guide assembly of claim 1 wherein: the lock mechanism for holding the slide includes a sleeve located around the slide and attached to the body and a retainer extended through the sleeve engageable with the slide to hold the slide in a fixed position on the body.

3. The off-set guide assembly of claim 1 wherein: the lock mechanism for holding the slide comprises a first sleeve located around the slide and attached to one end of the body and a second sleeve located around the slide and attached to the other end of the body, and retainers extended through the first and second sleeves engageable with the slide to hold the slide in a fixed position on the body.

4. The off-set guide assembly of claim 1 including: a handle connected to the slide useable to manually move the body, slide, adapter and power tool in said up and down directions.

5. The off-set guide assembly of claim 4 including: a holder for connecting the handle to the slide.

6. The off-set guide assembly of claim 1 wherein: the compound angle attachment comprises a first member connected to the slide, a second member connected to the adapter, said first and second members having surface engaging portions, and a pivot member connecting the first and second members and holding the surface engaging portions in surface contact, said pivot member allowing the second member to be pivoted relative to the first member thereby angularly positioning adapter and power tool held thereon relative to the horizontal slide, said lock member being operable to hold the second member in the selected angular position.

7. The off-set guide assembly of claim 1 wherein: the compound angle attachment comprises a first member attached to the slide, a second member, a first pivot member pivotally connecting the first member to the second member, a third member, a bar connecting the second member to the third member, a fourth member connected to the adapter, and a second pivot member pivotally connecting the third member to the fourth member, said lock members including a first lock member for holding the second member in a selected angular position relative to the first member, and a second lock member for holding the fourth member in a selected angular position relative to the third member.

8. The off-set guide assembly of claim 1 including: a handle connected to the attachment useable to manually move the adapter and power tool held thereon, and a holder for connecting the handle to the attachment.

9. An off-set guide assembly useable with a drill press having a base and chuck and a power tool for drilling holes in a workpiece comprising: an upright slide having an upper end attachable to the chuck of a drill press and a lower end, a tubular anchor adapted to be secured to the base of the drill press, said lower end of the vertical slide being telescoped into the tubular anchor to retain the slide in an upright position, a housing having an upright passage, said upright slide being extended through the upright passage, a lock on the housing engageable with the upright slide operable to fix the position of the housing on the upright slide, a body secured to the housing, said body having a horizontal passage, a horizontal slide extended through said passage and movable horizontally in the horizontal passage, a lock mechanism for holding the horizontal slide in a selected position on the body, an adapter for holding a power tool operable to drill a hole in a workpiece, and a connector for attaching the adapter to the horizontal slide whereby when the body and housing is moved in a downward direction the adapter and power tool held thereon moves toward a workpiece causing the power tool to drill a hole in the workpiece.

10. The off-set guide assembly of claim 9 including: a handle for manually moving the adapter and power tool held thereon, and a holder for connecting the handle to the horizontal slide.

11. The off-set guide assembly of claim 9 wherein: the lock mechanism for holding the horizontal slide includes a sleeve located around the horizontal slide and attached to the body and a retainer mounted on the sleeve engageable with the horizontal slide to hold the horizontal slide in a fixed position on the body.

12. The off-set guide assembly of claim 9 wherein: the lock mechanism for holding the horizontal slide comprises a first sleeve located around the horizontal slide and attached to one end of the body and a second sleeve located around the horizontal slide and attached to the other end of the body, and retainers mounted on the first and second sleeves engageable with the horizontal slide to hold the horizontal slide in a fixed position.

13. An off-set guide assembly useable with a support and a power tool for drilling holes in a workpiece comprising: a body adapted to be connected to the support for movement in up and down directions, said body having a horizontal passage, a horizontal slide extended through and moveable horizontally in the horizontal passage, a lock mechanism for holding the slide in a selected position on the body, an adapter for holding a power tool operable to drill a hole in a workpiece, a compound angle attachment connecting the slide to the adapter for allowing the adapter and power tool held thereon to be pivoted about two parallel transverse axes, and lock members for holding the adapter and power tool held thereon in a selected location whereby when the body is moved in the downward direction the adapter and power tool held thereon moves toward a workpiece causing the power tool to drill a hole in the workpiece.

14. An off-set guide assembly for a power tool for drilling a hole in a workpiece useable with a support comprising: a holder adapted to be connected to a support, a member secured to the holder, a housing having a passage accommodating the member, a body secured to the housing having a horizontal passage, a horizontal slide extended through the horizontal passage and movable horizontally in the horizontal passage, a lock mechanism for holding the horizontal slide in a selected position on the body, an adapter for holding a power tool operable to drill a hole in a workpiece, a compound angle attachment connecting the slide to the adapter for allowing the adapter and power tool held thereon to be pivoted about two parallel transverse axes, and lock members for holding the adapter and power tool held thereon in a selected location whereby the body and housing is moved downward the adapter and power tool held thereon moves toward a workpiece causing the power tool to drill a hole in the workpiece.

15. The off-set guide assembly of claim 14 including: a handle for manually moving the adapter and power tool held thereon, and a holder for connecting the handle to the horizontal slide.

\* \* \* \* \*